No. 752,313. PATENTED FEB. 16, 1904.
J. R. THOMAS & H. S. SPENCER.
FEEDING DEVICE FOR WOODWORKING MACHINES.
APPLICATION FILED DEC. 4, 1903.
NO MODEL. 5 SHEETS—SHEET 1.

Witnesses.
Inventors.

No. 752,313. PATENTED FEB. 16, 1904.
J. R. THOMAS & H. S. SPENCER.
FEEDING DEVICE FOR WOODWORKING MACHINES.
APPLICATION FILED DEC. 4, 1903.
NO MODEL. 5 SHEETS—SHEET 2.

No. 752,313. PATENTED FEB. 16, 1904.
J. R. THOMAS & H. S. SPENCER.
FEEDING DEVICE FOR WOODWORKING MACHINES.
APPLICATION FILED DEC. 4, 1903.
NO MODEL. 5 SHEETS—SHEET 5.
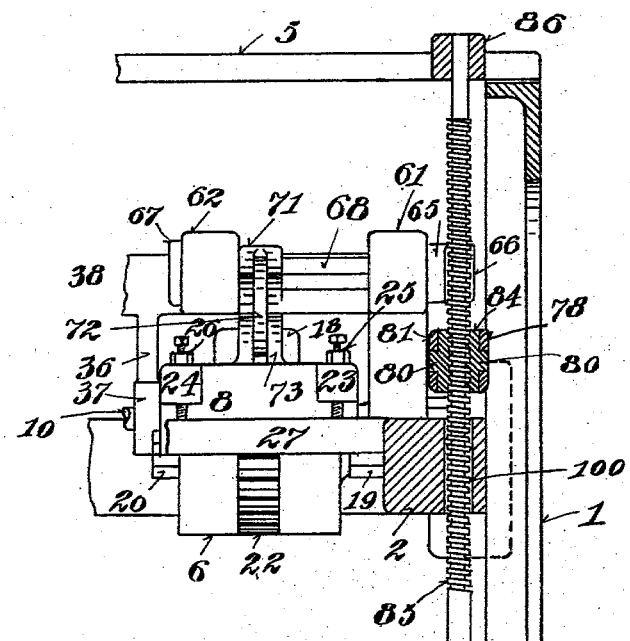
Fig. 5.
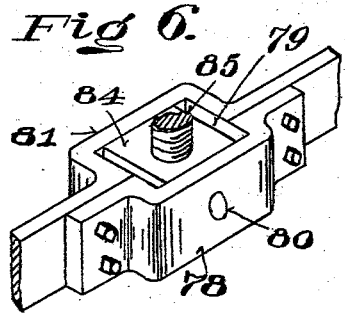
Fig 6.
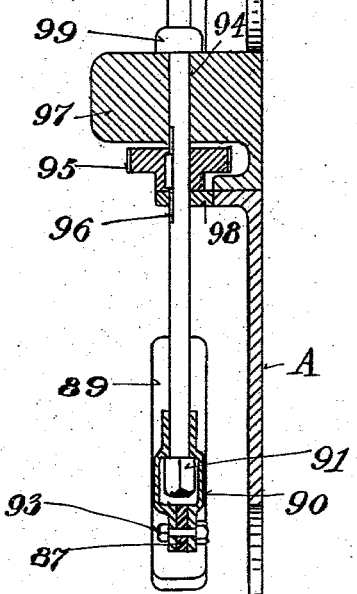
Witnesses.
Henry N. Baird
Herbert F. Harden
Inventors.
John R. Thomas,
Harry S. Spencer,
By A. F. Herbsleb, Their Attorney.

No. 752,313. Patented February 16, 1904.

UNITED STATES PATENT OFFICE.

JOHN R. THOMAS, OF CINCINNATI, AND HARRY S. SPENCER, OF NORWOOD, OHIO, ASSIGNORS TO J. A. FAY & EGAN COMPANY, OF CINCINNATI, OHIO, A CORPORATION OF WEST VIRGINIA.

FEEDING DEVICE FOR WOODWORKING-MACHINES.

SPECIFICATION forming part of Letters Patent No. 752,313, dated February 16, 1904.

Application filed December 4, 1903. Serial No. 183,745. (No model.)

*To all whom it may concern:*

Be it known that we, JOHN R. THOMAS, residing at Cincinnati, and HARRY S. SPENCER, residing at Norwood, in the county of Hamilton and State of Ohio, citizens of the United States, have jointly invented certain new and useful Improvements in Feeding Devices for Woodworking-Machines, of which the following is a specification.

Our invention relates to feeding devices for woodworking-machines especially adapted for timber-dressers, flooring-machines, or other type of planing-machine; and our invention will be readily understood from the following description and claims, and from the drawings, in which latter—

Figure 1:
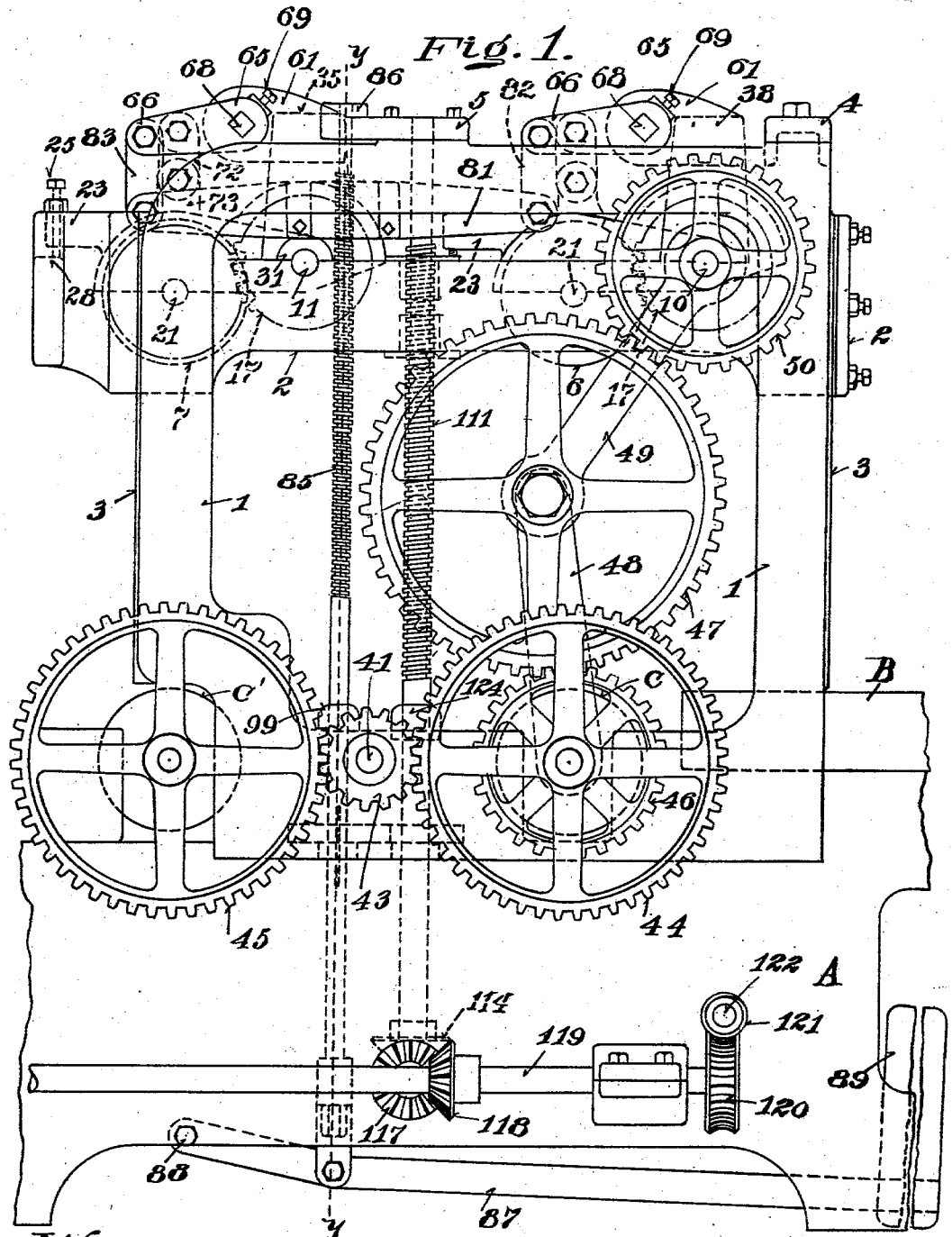
Figure 2:
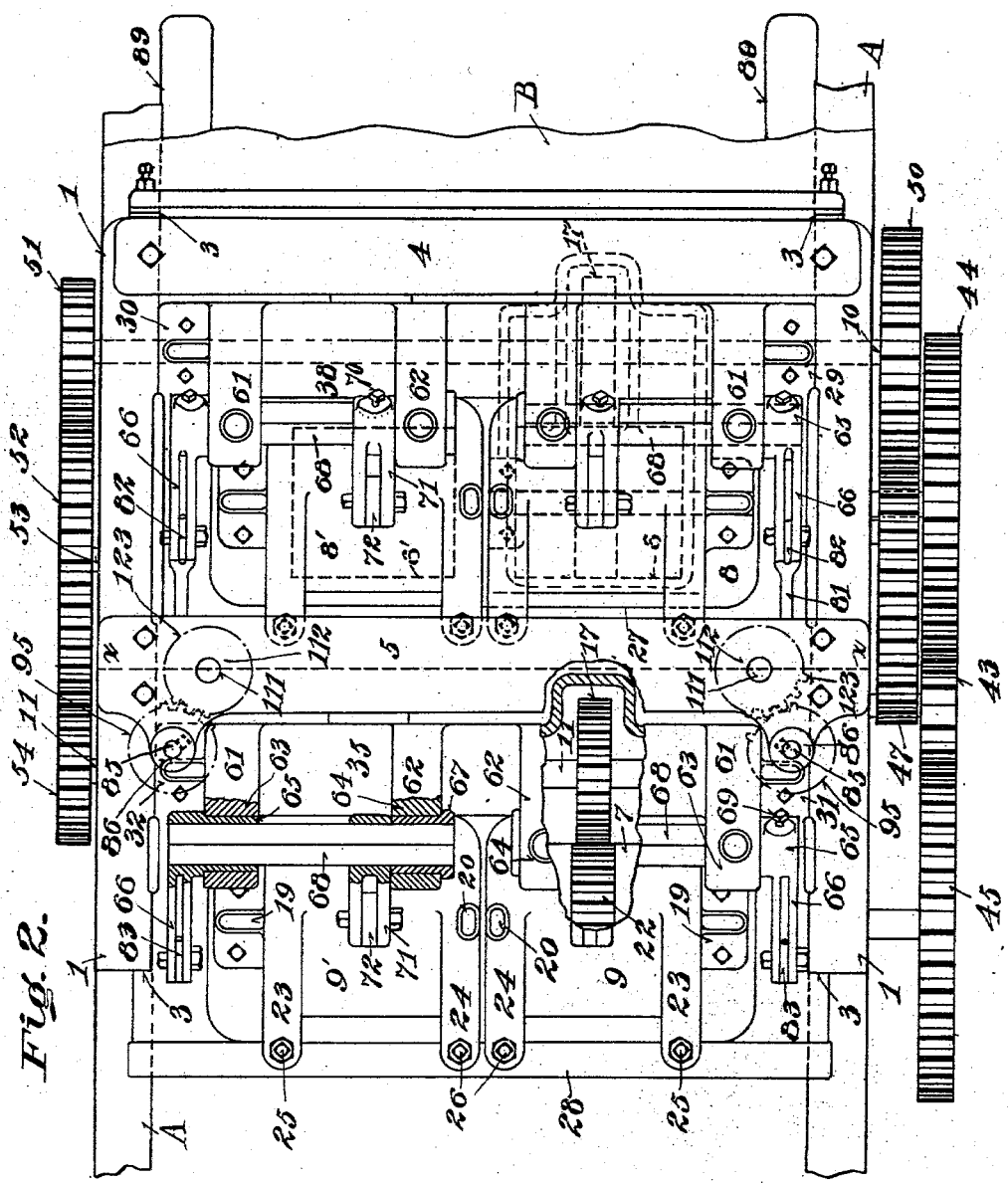
Figure 3:
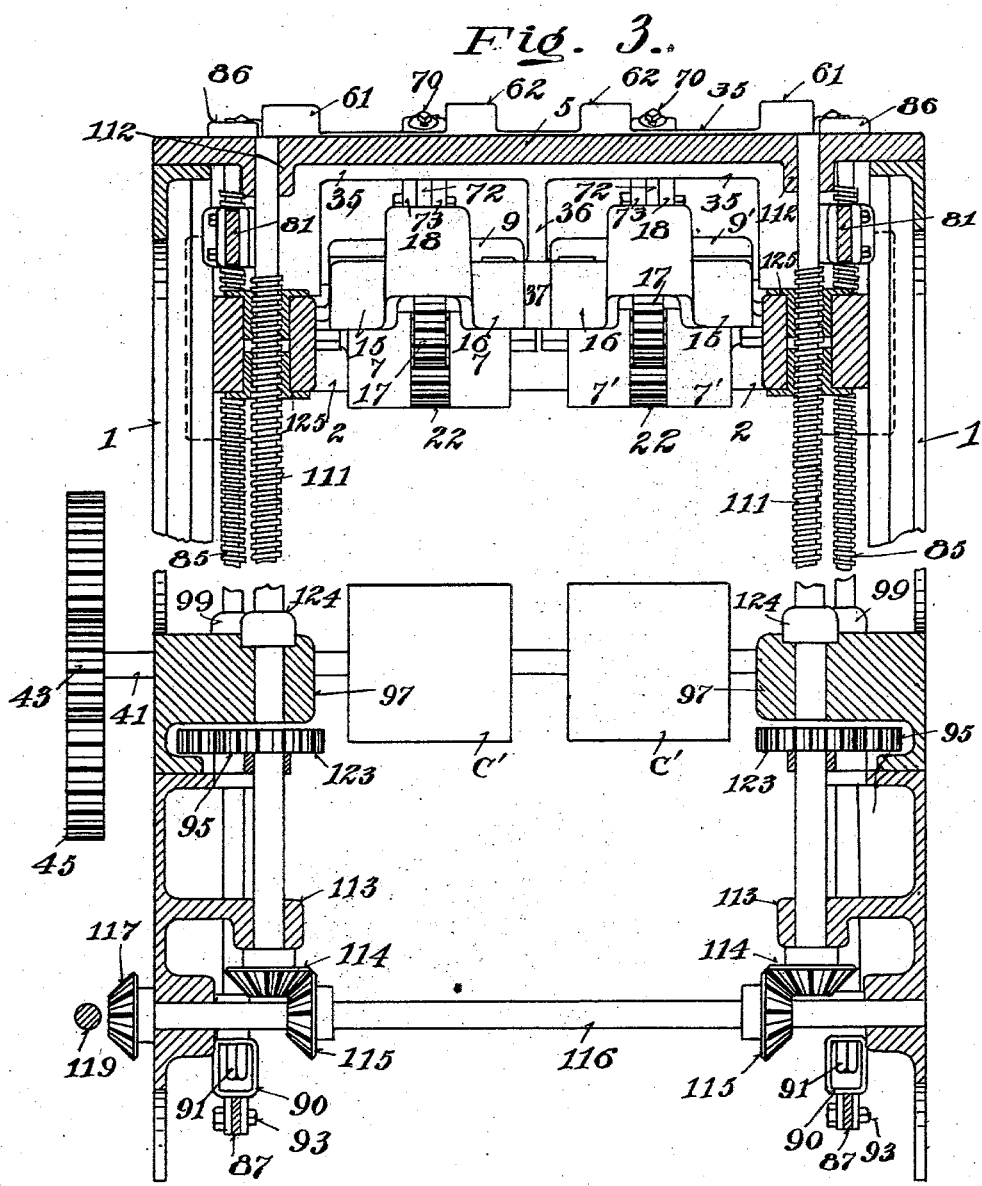
Figure 4:
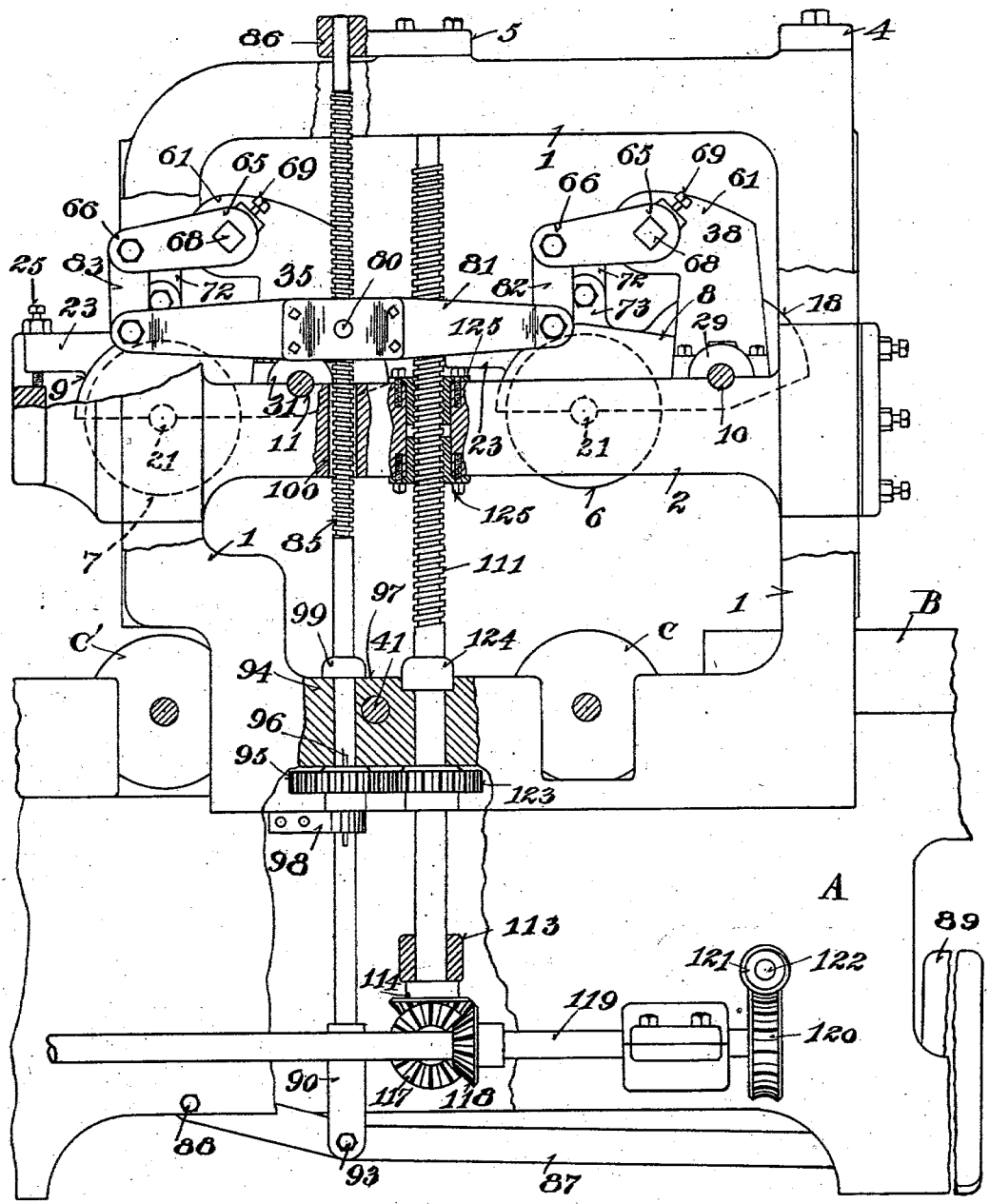

Figure 1 represents a side elevation of our improved device shown in connection with so much of a timber-dresser as is necessary to illustrate our invention. Fig. 2 is a plan view of the same, partly broken away for better illustration of parts. Fig. 3 is a cross-section of the same, taken on the line *x x* of Fig. 2. Fig. 4 is a side elevation of our improved device with the roll-saddle somewhat lowered, the side of the roll-stand partly broken away, and parts shown broken away or in section for better illustration of parts. Fig. 5 is a cross-section on the line *y y* of Fig. 1 looking toward the feed-in end of the machine and showing the yielding pressure mechanism of our improved device at one side of the machine, and Fig. 6 is a detail of the pivoted nut connection.

A represents the frame of a woodworking-machine, and B the table, with relation to which lower feed-rolls C C' are adjustable up and down in any suitable or well-known manner. The frame carries a stand 1, on which a saddle 2 is adjustable on ways 3. Cross-girths 4 5 span the sides of the stand for strengthening the same. The saddle is arranged to support the upper feed-works, shown as consisting of two pairs of divided rolls 6 6' 7 7'. The respective pairs of divided rolls are mounted in housings 8 8' 9 9', the housings 8 8' swinging about a shaft 10 and the housings 9 9' swinging about a shaft 11, which shafts 10 11 form the driving-shafts for the rolls. Each housing has bearings 15 16 taking about its driving-shaft, a gear 17 being secured to the driving-shaft between said bearings, with a hood 18 on the housing taking over said gear. Each housing also has bearings 19 20 for the shaft 21 of the feed-roll in the housing, and each feed-roll has a gear 22 in its face meshing with one of the gears 17. The housings also have extensions 23 24, in which set-bolts 25 26 are adjustable, the set-bolts resting on the respective cross-girths 27 28 on the saddle. The driving-shaft 10 is mounted in bearings 29 30 and the driving-shaft 11 is mounted in bearings 31 32. A cross-girth 35 spans the roll-stand 1 above the driving-shaft 11 and has a depending lug 36, in which is a bearing 37 for the driving-shaft 11, the bearing 37 taking between and separating the housings mounted about said driving-shaft. A similar cross-girth 38 spans the roll-stand above the driving-shaft 10 and has a depending lug and bearing for the driving-shaft 10 similar to the depending lug and bearing on cross-girth 35.

The rolls are driven from a shaft 41, driven from any suitable source of power, a pinion 43 on said shaft meshing with the gears 44 45, respectively, on the shafts of the lower rolls. The shaft of the roll C also carries a gear 46, meshing with a gear 47, mounted on expansion-links 48 49 and meshing a gear 50 on one end of the driving-shaft 10. At the other end of driving-shaft 10 is a gear 51, which meshes a gear 52, mounted on a stud 53 of the saddle, the gear 52 meshing with a gear 54 on the driving-shaft 11.

The cross-girths 35 and 36 have for the respective housings a pair of arms 61 62, projecting therefrom, having bearings 63 64. The bearing 63 has a sleeve 65 journaled therein, from which projects an arm 66. The bearing 64 has a sleeve 67 journaled therein. A rock-shaft 68 is received by the sleeves 65 67 and is preferably angular in cross-section and has angular seat in the sleeves 65 67 for causing the rock-shaft and sleeves to rock together. The sleeve 65 is secured against endwise movement on the angled shaft by a set-bolt 69. The rock-shaft also has an arm 71 rigidly secured thereto by set-bolt 70, the arm 71 having a link 72 connecting it to the lugs 73 on the roll-housing.

The pairs of divided rolls, as shown, are placed one in advance of the other, there being an arm 66 for each roll. The arms 66 in advance of each other are connected by an equalizing-bar through links 82 83, the links being pivoted, respectively, to the equalizing-bar and the arms. A nut 84 is pivoted on the equalizing-bar. A threaded rod 85 takes through and is threaded to said pivoted nut, the upper end of said rod taking through and sliding in a bearing 86 on the roll-stand. The threaded rod connects with a weight-lever 87, pivoted at 88 to the frame and carrying a weight 89.

The connection between the threaded rod and weight-lever is preferably made by having a yoke-shaped pendant 90, journaled to the rod above a nut 91, keyed to the end of the rod, a bolt 93 taking through apertures in the pendant and weight-lever for pivoting them together. The journal connection permits the rod to be turned. The threaded rod has a bearing 94 in a lug 97 on the roll-stand and is turned by a gear 95, having feather-and-spline connection 96 therewith for permitting the rod to move longitudinally, while maintaining rotating connection between gear and rod. The gear 95 is positioned between bearing 94 and a lug 98 on the frame. The screw-rod has longitudinal movement in the bearing 94. The said screw or threaded rod has a collar 99 thereon adapted to rest on lug 97 for limiting its downward movement. The threaded rod also has longitudinal movement in an aperture 100 in the saddle.

The upper roll-saddle is adjusted up and down on the roll-stand. At each side of the frame there is a screw 111, having a bearing 112 in the upper end of the roll-stand and a bearing 113 on the frame, the respective screws 111 being operated by means of bevel-gears 114 thereon meshing with bevel-gears 115 on a cross-shaft 116, having a bevel-gear 117, meshed by a bevel-gear 118 on an operating-shaft 119, having thereon a worm-wheel 120, operated by a worm 121 on a shaft 122, receiving motion from any source of power. The screw 111 has secured thereto a gear 123, meshing with the gear 95 on the threaded rod 85. The screw 111 is held against endwise movement. It is stepped on the lug 97 by a collar 124 on the screw. The screw takes through and is threaded to nuts 125 rigid on the saddle for adjusting the saddle with all the parts thereon, including the feed-rolls and equalizer, up and down for different thicknesses of stock. When screw 111 is turned, it simultaneously turns threaded rod 85 through the gears 123 95, thereby simultaneously permitting the threaded rod to turn in its threaded connection with the equalizer for permitting the equalizer to be adjusted up and down with the saddle and maintaining pressure connection with the equalizer at the various saddle elevations, so that the position of the pressure agency is substantially undisturbed and the pressure from the weight is exerted in equal degree irrespective of the elevation of the upper feed-rolls.

The threads of rod 85 form transverse ridges on the rod. The nut 84 forms a follower connection for the rod 85 for maintaining pressure connection between the rod and equalizer at the various saddle elevations. The longitudinal movement permitted, the threaded rod permits the upper feed-rolls to be raised and lowered by the stock passing through the machine under continuing pressure from the pressure agency.

In operation when the stock is passed into the machine it will first take against and raise the first or feed-in roll—for instance, roll 6—thereby raising the housing 9 of that roll, the housing raising the arm 71 and rocking the same, thereby rocking the shaft 68 and arm 66, exerting lifting action against the equalizing-bar and through it and the threaded rod 85 upon the weight, the equalizing-bar employing its pivotal connection with the arm 66 of the second roll as a fulcrum. When the stock reaches the roll 7, it will raise that roll and the arm of the equalizing-bar with which it is connected, using the pivotal connection between the equalizing-bar and the housing 8 as its fulcrum. It will thus be seen that the weight exerts equalizing pressure upon both rolls. Each side of the machine is preferably provided with equalizing pressure devices of this kind, so that each roll of each pair has equalizing pressure exerted thereon, the rolls being given a parallel lift throughout. In the form shown the pivoted nut swings on pivots 80 in an opening 79 between the equalizer-bar proper and a plate 78, bolted to the bar.

Having thus fully described our invention, what we claim as new, and desire to secure by Letters Patent, is—

1. In combination, in a planing-machine, the upper feeding-rolls, a saddle, means for adjusting same, equalizers, and threaded rods for retaining the equalizers in same relative position to the rolls in all their adjustments.

2. In combination, in a planing-machine, the upper feeding-rolls, a saddle, means for adjusting same, equalizers, and threaded rods for retaining the equalizers in same relative position to the rolls in all their adjustments and pressure device having connection with the threaded rods.

3. In a feeding device for woodworking-machine, the combination of upper feed-rolls, a saddle for the same, means for adjusting the saddle, equalizers for the feed-rolls, threaded rods maintaining pressure connection with the equalizers at various saddle elevations, connections permitting adjustment of equalizers with the saddle, and pressure device having connection with the threaded rods, substantially as described.

4. In a feeding device for woodworking-machines, the combination of a frame, upper feed-rolls, a saddle for same, means for adjusting the saddle with relation to the frame, equalizer for the feed-rolls, rod having transverse ridges and follower connection therefor with the equalizer, and pressure device having connection with said rod.

5. In a feed device for woodworking-machine, the combination of a frame, an upper feed-roll, a saddle for the same, a yielding roll-housing on the saddle, means for adjusting the saddle with relation to the frame, rod having transverse ridges and follower connection therefor with the roll-housing, and pressure device having connection with said rod.

6. In a feeding device for woodworking-machine, the combination of a frame, an upper feed-roll, a saddle, a roll-housing for the latter, screws for adjusting the saddle with relation to the frame, a pressure device, a threaded rod having longitudinal movement with relation to said screws, and connection therefor with said roll-housing, connection between said rod and the pressure device, and gearing between one of said screws and threaded rod.

7. In a feeding device for woodworking-machines, the combination of a frame, a saddle, upper roll-housing on the saddle, pressure device, and parallel screws and connections therefor respectively with the frame and saddle for adjusting the saddle with relation to the frame and with the roll-housing and pressure device for exerting pressure on the roll at various saddle adjustments, and driving connection between said screws.

8. In combination, in feeding mechanism for a woodworking-machine, a saddle, a feeding device yieldingly mounted thereon, a pressure device, a pair of screws at each side of the machine, gearing between the screws of each pair, one of the screws of each pair having threaded connection with the saddle and the other having threaded connection with said yieldable feeding device and the pressure device, substantially as described.

9. In a feeding device for woodworking-machines, the combination with the frame, saddle, roll-housing and pressure device, of screws and threaded rod rotated together, said screws connecting with said saddle for adjusting the same with relation to the frame, and said threaded rod having connection with said roll-housing and pressure device, the threaded rod movable longitudinally with relation to the screws, substantially as described.

10. In a feeding device for woodworking-machines, the combination of the frame, a saddle, an upper feeding device thereon, a pressure device, means permitting yielding of said upper feeding device on said saddle, a threaded rod connecting said latter means with said pressure device, screws for raising and lowering said saddle with relation to the frame, and means causing simultaneous rotation of said screws and threaded rod, substantially as described.

11. In a feeding device for woodworking-machines, the combination with the frame and upper roll-stand, a saddle, a plurality of roll-housings pivoted with relation thereto, an equalizer connecting said housings, a weight-lever, screws for adjusting said saddle, a threaded rod connecting said equalizer and weight-lever, and means for simultaneously rotating said screws and threaded rod, substantially as described.

12. In a feeding device for woodworking-machines, the combination with the frame, lower feed-rolls, upper roll-saddle, yielding roll-housings mounted thereon, equalizer connecting the housings, pressure device below the lower feed-rolls, and plurality of screw-rods, having connection respectively with the saddle and with the equalizer and pressure device below the lower feed-rolls, substantially as described.

13. In a feeding device for woodworking-machines, the combination of a frame, a roll-stand thereon, a saddle, screws journaled in the upper end of the roll-stand for adjusting the saddle on the roll-stand, upper feed-roll, a housing therefor on the saddle, a longitudinally-movable threaded rod journaled in the upper end of the roll-stand and having threaded connection with the upper roll-housing for retaining pressure connection therewith throughout the various saddle adjustments, and a pressure device connecting with said rod, substantially as described.

14. In a feeding device for woodworking-machines, the combination of a frame, a roll-stand thereon, a saddle, screws journaled in the upper end of the roll-stand for adjusting the saddle on the roll-stand, upper roll-housings on the saddle, an equalizer having connection therewith, a longitudinally-movable threaded rod journaled in the upper end of the roll-stand and having threaded connection with the equalizer for retaining pressure connection therewith throughout the various saddle adjustments, and a pressure device connecting with said rod, substantially as described.

15. In a feeding mechanism for wood-planing machinery, the combination of a frame, a saddle, means for adjusting the saddle with relation to the frame, upper feed-rolls, housings therefor on the saddle, an equalizer having connection with the housings, a pivoted nut on the equalizer, a pressure device, a threaded rod in said nut having connection with the pressure device and connections permitting adjustment of the equalizer with the saddle, substantially as described.

In testimony whereof we have signed our names hereto in the presence of two subscribing witnesses.

JOHN R. THOMAS.
HARRY S. SPENCER.

Witnesses:
JOHN J. TIGHE,
JOHN F. KRENKEL.